US007423797B2

(12) United States Patent
Nakade

(10) Patent No.: US 7,423,797 B2

(45) Date of Patent: Sep. 9, 2008

(54) COLOURED STRUCTURES

(75) Inventor: Shogo Nakade, Tokyo (JP)

(73) Assignee: Spyder Navigations L.L.C., Wilmington, DE (US)

( * ) Notice: Subject to any disclaimer, the term of this patent is extended or adjusted under 35 U.S.C. 154(b) by 126 days.

(21) Appl. No.: 10/859,614

(22) Filed: Jun. 3, 2004

(65) Prior Publication Data

US 2005/0270765 A1 Dec. 8, 2005

(51) Int. Cl.
*G02F 1/15* (2006.01)

(52) U.S. Cl. ........................ 359/265; 359/266; 359/270

(58) Field of Classification Search .................. 359/265
See application file for complete search history.

(56) References Cited

U.S. PATENT DOCUMENTS

| | | | | |
|---|---|---|---|---|
| 4,924,358 | A * | 5/1990 | Von Heck | 362/555 |
| 5,082,355 | A * | 1/1992 | Warszawski | 359/265 |
| 5,485,355 | A * | 1/1996 | Voskoboinik et al. | 362/84 |
| 5,880,872 | A * | 3/1999 | Udaka | 359/273 |
| 6,736,674 | B2 * | 5/2004 | Korte et al. | 439/578 |
| 2004/0201878 | A1 * | 10/2004 | Agrawal et al. | 359/266 |
| 2006/0034096 | A1 * | 2/2006 | Chernick et al. | 362/551 |

* cited by examiner

*Primary Examiner*—Jessica T Stultz

(57) ABSTRACT

An elongate colored structure comprising: an electrically conductive wire; a dye layer surrounding a length of the conductive wire; and an electrically conductive, light transmissive layer surrounding the dye layer; wherein the dye layer is capable of changing its color when a voltage is applied between the conductive wire and the light transmissive layer.

23 Claims, 2 Drawing Sheets

COLOURED STRUCTURES

FIELD OF THE INVENTION

The present invention relates to coloured structures, and particularly but not exclusively to elongate coloured structures suitable for application to surfaces of portable devices to provide a fur effect.

BACKGROUND OF THE INVENTION

The market for portable devices such as mobile telephones, personal digital assistants, and MP3 players is highly competitive and it is therefore desirable for manufacturers of such devices to produce distinctive aesthetic effects to attract customers. It is known to produce replaceable coloured plastic cases for mobile telephones, and covers comprising other materials such as leather and fur are also available. Illumination effects have also been used on mobile telephones. It is therefore desirable to produce an effect which would allow a device to stand out from competitors' products, and preferably an effect which is modifiable by a user.

STATEMENT OF THE INVENTION

According to a first aspect of the present invention there is provided an elongate coloured structure comprising: an electrically conductive wire; a dye layer surrounding a length of the conductive wire; and an electrically conductive, light transmissive layer surrounding the dye layer; wherein the dye layer is capable of changing its colour when a voltage is applied between the conductive wire and the light transmissive layer.

The structure could have a diameter of less than 1 mm, and its diameter is preferably less than 0.5 mm and most preferably less than 0.2 mm.

The light transmissive layer could comprise a plastic and/or a conductive, light transmissive material such as indium tin oxide or fluorine doped $SnO_2$.

The thickness of the dye layer is preferably less than 50 μm, more preferably less than 20 μm, and most preferably less than 10 μm.

The structure could be capable of exhibiting more than two colours, and the colour of the dye layer could be dependent upon the voltage applied between the conductive wire and the light transmissive layer.

The structure is preferably flexible.

The dye layer could comprise an oxidation dye or a reduction dye, and it could comprise a viologen. The dye layer could also comprise a porous insulating or semi-conducting material.

According to a second aspect of the present invention there is provided a portable device comprising a plurality of structures as described above extending longitudinally from an exterior surface of the device, and further comprising a driving arrangement for selectively applying voltages to the structures.

The driving arrangement could comprise a series of row electrodes and a series of column electrodes, each connectable to a power supply, each of the plurality of structures being electrically connectable to one of the row electrodes and one of the column electrodes such that a voltage can be applied across the dye layer of any one of the plurality of structures by applying a voltage between the row electrode and the column electrode connected to the respective structure.

The device could further comprise a memory for storing one or more predefined modes, each mode indicating, for each of the plurality of structures, a voltage, and each voltage being associated with a colour of the respective structure.

The device could further comprise a user input mechanism allowing a user to select one of the predefined modes, thereby causing each of the plurality of structures to adopt a respective colour for the selected mode.

The driving arrangement is preferably capable of being configured to vary the voltages applied to the structures with time.

The device could further comprise an analysing unit for analysing a digital image and an output unit for outputting to the driving arrangement a signal indicating, for each structure, a voltage to be applied to the structure, wherein the driving arrangement is configured to apply the indicated voltages to the plurality of structures such that the image is emulated by the plurality of structures.

According to a third aspect of the present invention there is provided a removable cover for a portable device, the cover comprising a plurality of structures as described above extending longitudinally from an exterior surface of the cover, the structures being electrically connectable to a driving arrangement for selectively applying voltages to the structures.

The removable cover could further comprise an electrical bus for connecting the structures to a driving arrangement for selectively applying voltages to the structures.

According to a fourth aspect of the present invention there is provided a portable device having a fur-textured outer cover, the fur being formed of fibres whose colour is variable under the control of the device.

BRIEF DESCRIPTION OF THE DRAWINGS

The present invention will now be described by way of example with reference to the accompanying drawings in which.

DETAILED DESCRIPTION

Figure 1:
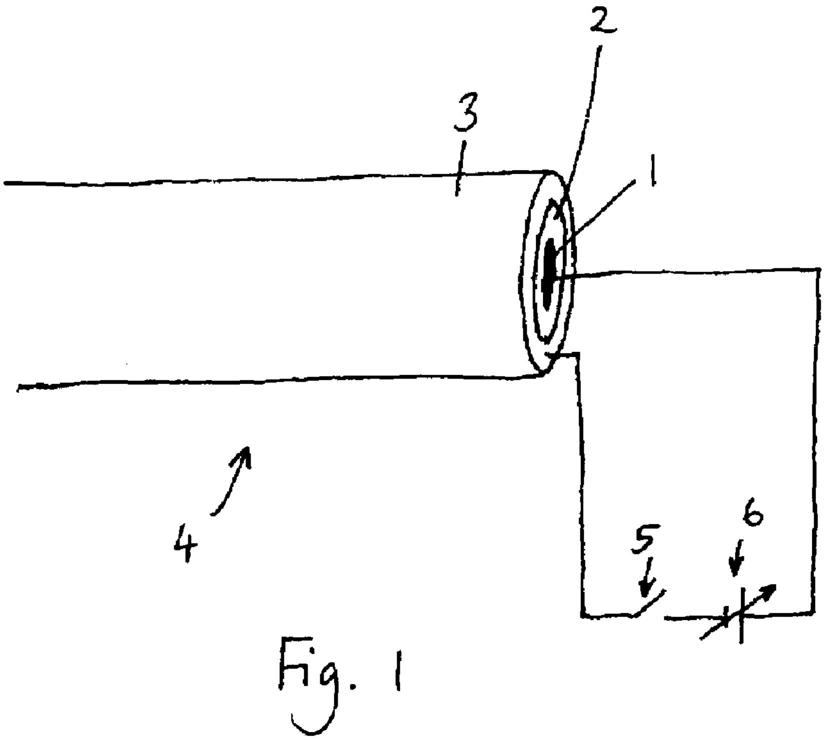
FIG. 1 shows a coloured structure.

FIG. 1 shows an elongate coloured structure 4 consisting of three parts; an inner wire 1 which is electrically conductive; a dye layer 2 which surrounds the wire 1; and an outer layer 3 which is light transmissive and electrically conductive and is arranged coaxially with the wire 1 and the dye layer 2. Circuitry is provided as shown in FIG. 1, connecting the wire 1 to the light transmissive layer 3 via a switch 5 and a variable power supply 6. When the switch 5 is closed, a potential difference is applied between the wire 1 and the light transmissive layer 3, across the dye layer 2. If the potential difference is sufficiently large, then the dye layer 2 is caused to oxidise (whereby dye molecules lose one or more electrons) or reduce (whereby dye molecules gain one or more electrons), depending on the type of dye. By causing a dye to enter an oxidised or a reduced state, the colour exhibited by the dye can be modified due to different wavelengths of incident light being absorbed by the dye depending on its state of oxidation. Thus, the dye layer could suitably exhibit one colour (which could be black, white or any other optical colour) in one oxidation state and a different colour in another state.

The dye layer could suitably comprise one or more dyes such as viologens, adsorbed onto a layer of a porous, insulating or semi-conductive material such as a nano-porous metal oxide, for example $TiO_2$ or ZnO, and an electrolyte containing a redox couple, or hole conducting material, for penetrating into pores of the metal oxide layer to obtain an electrical contact between the dyes and the outer transparent electrode.

The structure could be made in a similar manner to the way in which coaxial electrical cables are manufactured. Firstly, a nano-porous $TiO_2$ layer on a metal wire could be formed by dipping into a colloidal suspension of $TiO_2$ nano-particles, followed by sintering, or alternatively the metal-oxide layer could be formed by sputtering, or hydro-thermal synthesis directly on the wire. The dye or dyes could then be adsorbed on the metal-oxide layer by dipping the wire into a solution containing dye. Electrolytes in the solution could penetrate into the pores of the metal-oxide layer by capillary action. The $TiO_2$ layer is not conductive (it is a semi-conductor) and so a short circuit between the inner wire and the outer layer of the structure is avoided.

In embodiments of the invention, the dye layer is capable of exhibiting different colours depending on the magnitude of the voltage applied across the layer. For example, a particular dye could have a dark brown hue in an unoxidised state. If a relatively low voltage is applied across a layer of the dye, a single electron might be removed from the dye molecules, causing an oxidation state of I in which certain wavelengths of light are no longer absorbed. In oxidation state I the dye might appear blue. If a higher voltage is then applied across the dye layer, a second electron might be removed, thus causing an oxidation state of II and in this state further wavelengths are no longer absorbed. The dye therefore exhibits a third colour, which might be white, in oxidation state II. This process would allow aesthetically attractive effects to be produced by varying the voltage across a structure such as that shown in FIG. 1. By varying the voltage applied across a dye layer 2 with time, time-varying colour effects could be produced. A suitable voltage range for embodiments of the invention is −3 to 3V. For example, a viologen dye typically changes from a "bleached" state at −1V to a coloured state at +1V. Clearly, the appropriate voltage range for a particular embodiment will depend on the types of dyes used.

The material of the outer layer 3 is light transmissive so that incident light can pass through to the dye layer 2 and subsequently be reflected from the dye layer 2 and exit the structure. The outer layer 3 could suitably comprise two separate components: a substrate and a conductive layer. The substrate could suitably be any transparent or translucent plastic material. Suitable materials for the conductive layer include fluorine doped $SnO_2$ and indium tin oxide, which are commonly used in applications such as solar cells and flat panel displays. Alternatively, the conductive layer could be a very thin metal layer. For example, thin gold can transmit light.

Figure 2:
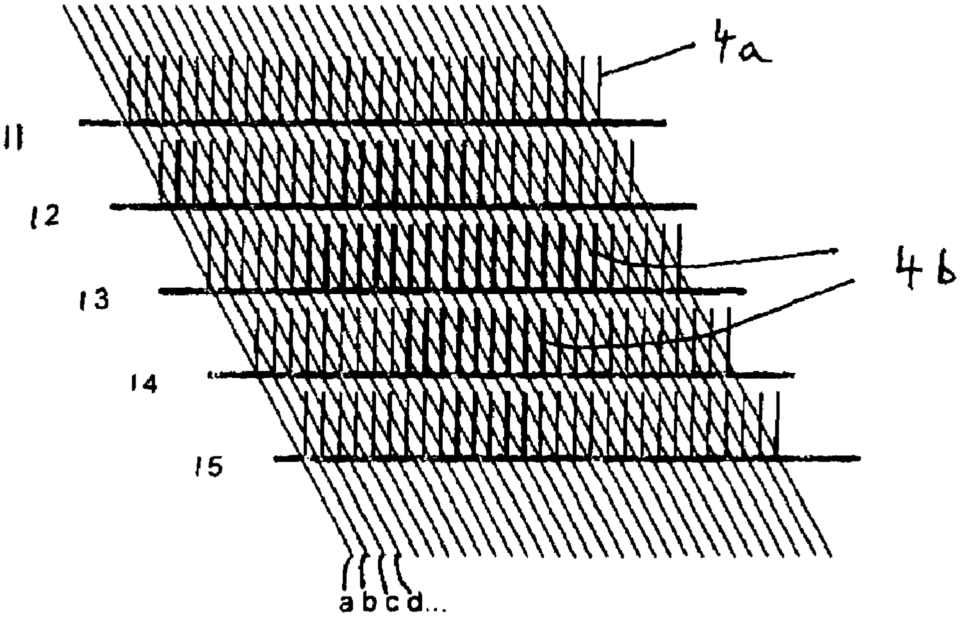
FIG. 2 shows an array of coloured structures.

FIG. 2 shows an embodiment having a series of coloured structures 4 arranged extending from a surface of a device in a grid pattern to produce a coloured fur effect. This embodiment has a series of "row" electrodes 11 to 15 and a series of "column" electrodes a, b, c, d etc. A potential difference can selectively be applied to any pair of a row electrode and a column electrode by a driving arrangement (5, 6) such as that shown in FIG. 1. Each structure has its inner conductive wire 1 connectable to a column electrode and its light transmissive outer layer 3 connectable to a row electrode, and in this way a potential difference can selectively be applied across each structure to cause the oxidation state of the dye layer in the respective structure to change. In the example shown in FIG. 2, a potential difference is applied between row electrode 12 and column electrode b so as to cause the colour of the structure at the junction of those two electrodes to change.

The structures (4*b*) located around the centre of the arrangement of FIG. 2 are indicated as exhibiting a first colour due to a first state of oxidation. The structures (4*a*) represented in FIG. 2 by a thin vertical line are currently in a second oxidation state and are exhibiting a second colour.

Figure 3:
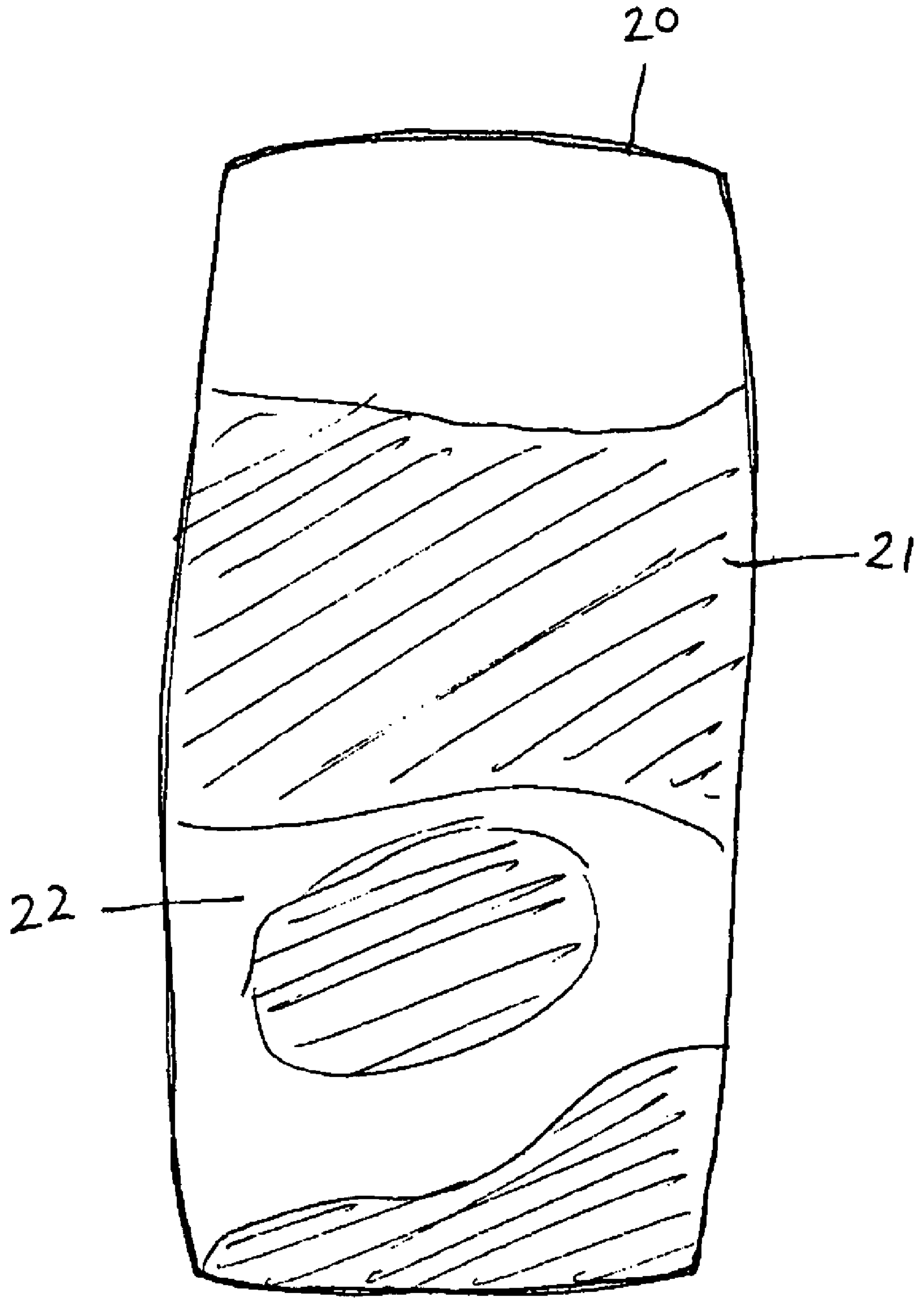
FIG. 3 shows a portable device provided with an array of colour-changeable structures.

FIG. 3 shows a further embodiment in which a portable device 20 such as a mobile communications device is covered on its rear surface with coloured structures as described above to produce a fur subsystem. The embodiment is arranged so that the fur subsystem exhibits different colours at different locations, and the resulting effect is fur resembling that of a panda. Regions 21 of the fur subsystem exhibit a black colour and regions 22 exhibit a white colour. The two colours could be provided by a single type of dye in two different states of oxidation (that is, with two different voltage levels being applied across the dye layers of the structures), or alternatively by more than two types of dye, each type having a different colour in its unoxidised state.

The different states of a dye could each be stable so that, for example, when a voltage is applied across the dye thereby changing its colour, and the voltage is subsequently removed the dye remains in the new state and continues, at least for a few seconds or a few minutes, to exhibit the new colour. Alternatively some of the states could be unstable so that when a dye is caused to change from a first state to a second state by means of an applied voltage, and the voltage is then removed, the dye returns substantially instantaneously to its first state.

In a further embodiment, a portable device having an array of coloured structures arranged on it can have a memory for storing a series of predefined patterns or pictures. Each pattern or picture designates a potential difference for each of the coloured structures on the device. The designated potential differences could, for example, be 0V, a relatively low voltage, and a relatively high voltage, or they could simply be "on" or "off". A user can preferably select one of these predefined patterns, causing a driving arrangement to selectively apply voltages to the light emissive structures according to the designated state of each structure so as to achieve the selected pattern. Pictures could be displayed in this way, as could letters and numbers. The letters and numbers to be displayed could be selectable by a user to allow a user to personalise his portable device. In a particular embodiment, it could be possible for a user to enter his own personalised picture to be displayed by the array of structures. For example, the user could upload a photograph onto his portable device and select that photograph to be the displayed pattern. Software and circuitry within the device could then: analyse the photograph; approximate at least a portion of the photograph to a pixellated image, having a number of "pixels" equal to the number of coloured structures provided on the device; approximate the actual colour of each "pixel" of the image to one of the colours available from the dyes of the coloured structures affixed to the device; assign an appropriate voltage to each structure according to the required colour of an associated "pixel"; and apply the assigned voltages to each structure to produce an approximation of the photograph on a surface of the portable device.

The coloured structures could be flexible so that a "fur" effect could be created on the surface of a device, or alternatively they could be rigid. The structures could also be relatively short in the direction of the axis of the wire, thus giving an effect of a planar display, more highly resolved than a "fur" effect display.

Changing display effects could be produced by constantly varying the voltage applied across the dye layers such that the colour of the structures varies with time. A portable device could be provided with optional settings which can be selected by a user to provide such a varying effect.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. An elongate colored structure comprising:

an electrically conductive wire;

a dye layer surrounding at least a portion of the electrically conductive wire, wherein the dye layer absorbs a first wavelength of light corresponding to a first color when the dye layer is in a first state, and further wherein the dye layer has a thickness of less than 50 μm; and an electrically conductive, light transmissive layer surrounding at least a portion of the dye layer;

wherein the dye layer enters a second state when a voltage is applied between the electrically conductive wire and the light transmissive layer, wherein the dye layer absorbs a second wavelength of light corresponding to a second color when the dye layer is in the second state.

2. The structure as claimed in claim 1 having a diameter of less than 0.5 mm.

3. The structure as claimed in claim 1 having a diameter of less than 0.2 mm.

4. The structure as claimed in claim 1 wherein the light transmissive layer comprises a plastic.

5. The structure as claimed in claim 1 wherein the light transmissive layer comprises indium tin oxide or fluorine doped $SnO_2$.

6. The structure as claimed in claim 1 wherein a thickness of the dye layer is less than 20 μm.

7. The structure as claimed in claim 1 wherein a thickness of the dye layer is less than 10 μm.

8. The structure as claimed in claim 1, wherein the dye layer is configured to absorb a third wavelength of light when a second voltage is applied between the electrically conductive wire and the light transmissive layer, wherein absorption of the third wavelength of light causes the dye layer to have a third color.

9. The structure as claimed in claim 1 wherein the structure is flexible.

10. The structure as claimed in claim 1 wherein the dye layer comprises an oxidation dye or a reduction dye.

11. The structure as claimed in claim 1 wherein the dye layer comprises a viologen.

12. The structure as claimed in claim 1 wherein the dye layer comprises a porous insulating material or a semi-conducting material.

13. A portable device, comprising:

a plurality of structures extending from an exterior surface of the device, and further comprising a driving unit configured to selectively apply voltages to the plurality of structures, wherein each of the plurality of structures comprises an electrically conductive wire;

a dye layer surrounding at least a portion of the electrically conductive wire; and an electrically conductive, light transmissive layer surrounding at least a portion of the dye layer;

wherein the dye layer is configured to change its color when a voltage is applied between the electrically conductive wire and the light transmissive layer; and an analyzing unit in communication with the driving unit and configured to analyze an image, wherein the driving unit is configured to selectively apply the voltages to the plurality of structures such that the image is represented by the plurality of structures.

14. The device as claimed in claim 13 wherein the driving unit comprises a series of row electrodes and a series of column electrodes, wherein each of the plurality of structures is electrically connected to one of the row electrodes and one of the column electrodes such that the voltage is applied across the dye layer.

15. The device as claimed in claim 13 further comprising a memory for storing a predefined mode, wherein the predefined mode includes a predefined voltage to be applied to each of the plurality of structures.

16. The device as claimed in claim 15 further comprising a user input mechanism allowing a user to select the predefined mode such that each of the plurality of structures has a predefined color.

17. The device as claimed in claim 13 wherein the driving unit is configured to vary the voltages applied to the plurality of structures with time.

18. A removable cover for a portable device, the cover comprising:

a plurality of structures extending from an exterior surface of the cover, wherein the plurality of structures are electrically connected to a driving arrangement, wherein each structure comprises an electrically conductive wire;

a dye layer surrounding at least a portion of the electrically conductive wire; and an electrically conductive, light transmissive layer surrounding at least a portion of the dye layer;

wherein the dye layer is configured to change its color when a voltage is applied between the electrically conductive wire and the light transmissive layer; and an analyzing unit in communication with the driving arrangement and configured to analyze an image, wherein the driving arrangement is configured to selectively apply voltages to the plurality of structures such that the image is represented by the plurality of structures.

19. The removable cover as claimed in claim 18 further comprising an electrical bus for connecting the plurality of structures to the driving arrangement.

20. A method for constructing an elongated colored structure, the method comprising:

providing an electrically conductive wire;

surrounding at least a portion of the electrically conductive wire with a dye layer having a thickness less than 50 μm; and surrounding at least a portion of the dye layer with an electrically conductive, light transmissive layer, wherein the dye layer is configured to absorb a first wavelength of light corresponding to a first color when there is not an electric potential across the dye layer, and further wherein the dye layer is configured to absorb a second wavelength of light corresponding to a second color when a voltage is applied between the electrically conductive wire and the light transmissive layer.

21. An apparatus comprising:

an electrically conductive means for conducting electricity;

a dye layer means surrounding at least a portion of the electrically conductive means, wherein said dye layer means absorbs a first wavelength of light corresponding to a first color when the dye layer is in a first state, and further wherein the dye layer means has a thickness of less than 50 μm; and an electrically conductive, light transmissive means surrounding at least a portion of the dye layer means, said light transmissive layer for transmitting light;

wherein the dye layer means is configured to enter a second state when a voltage is applied between the electrically conductive means and the light transmissive means, wherein the dye layer means absorbs a second wavelength of light corresponding to a second color when the dye layer means is in the second state.

22. A portable device comprising:

a plurality of structures extending from an exterior surface of the device, further comprising a driving arrangement configured to selectively apply voltages to the plurality of structures, an analyzing unit for analyzing a digital image and an output unit for outputting to the driving arrangement a signal indicating, for each structure, a voltage to be applied to the structure such that the image is represented by the plurality of structures, wherein each of the plurality of structures comprises an electrically conductive wire;

a dye layer surrounding at least a portion of the electrically conductive wire; and an electrically conductive, light transmissive layer surrounding at least a portion of the dye layer;

wherein the dye layer is configured to change its color when the voltage is applied between the electrically conductive wire and the light transmissive layer.

23. The structure as claimed in claim 1, said structure having a diameter of less than 1 mm.

* * * * *